April 15, 1952     O. E. GLOVER     2,593,020
FLYWHEEL HOUSING
Filed March 22, 1950     2 SHEETS—SHEET 2
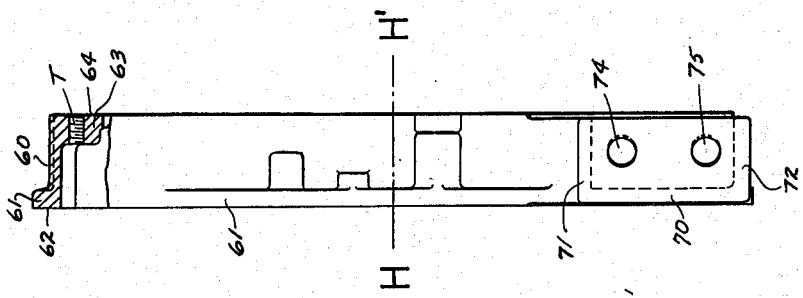
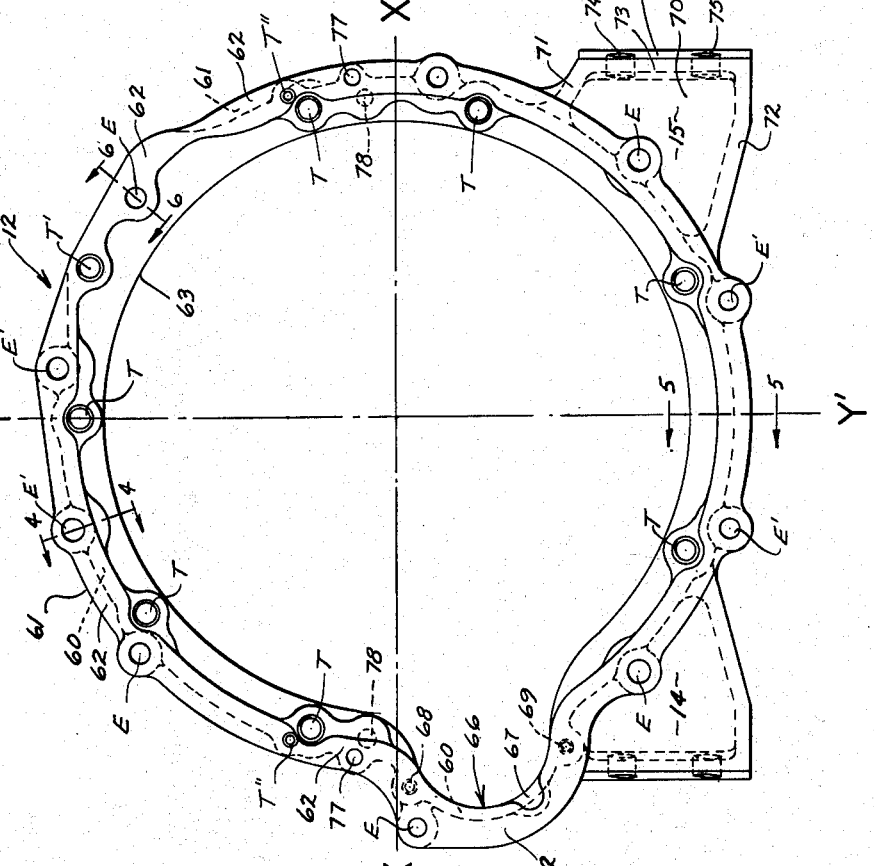
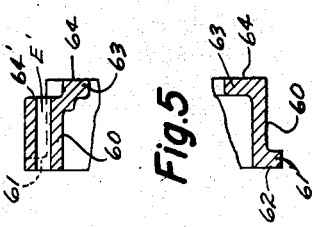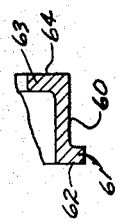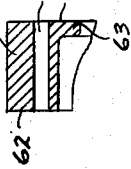
OLAF E. GLOVER
INVENTOR.
BY Beale and Jones
ATTORNEYS Patented Apr. 15, 1952

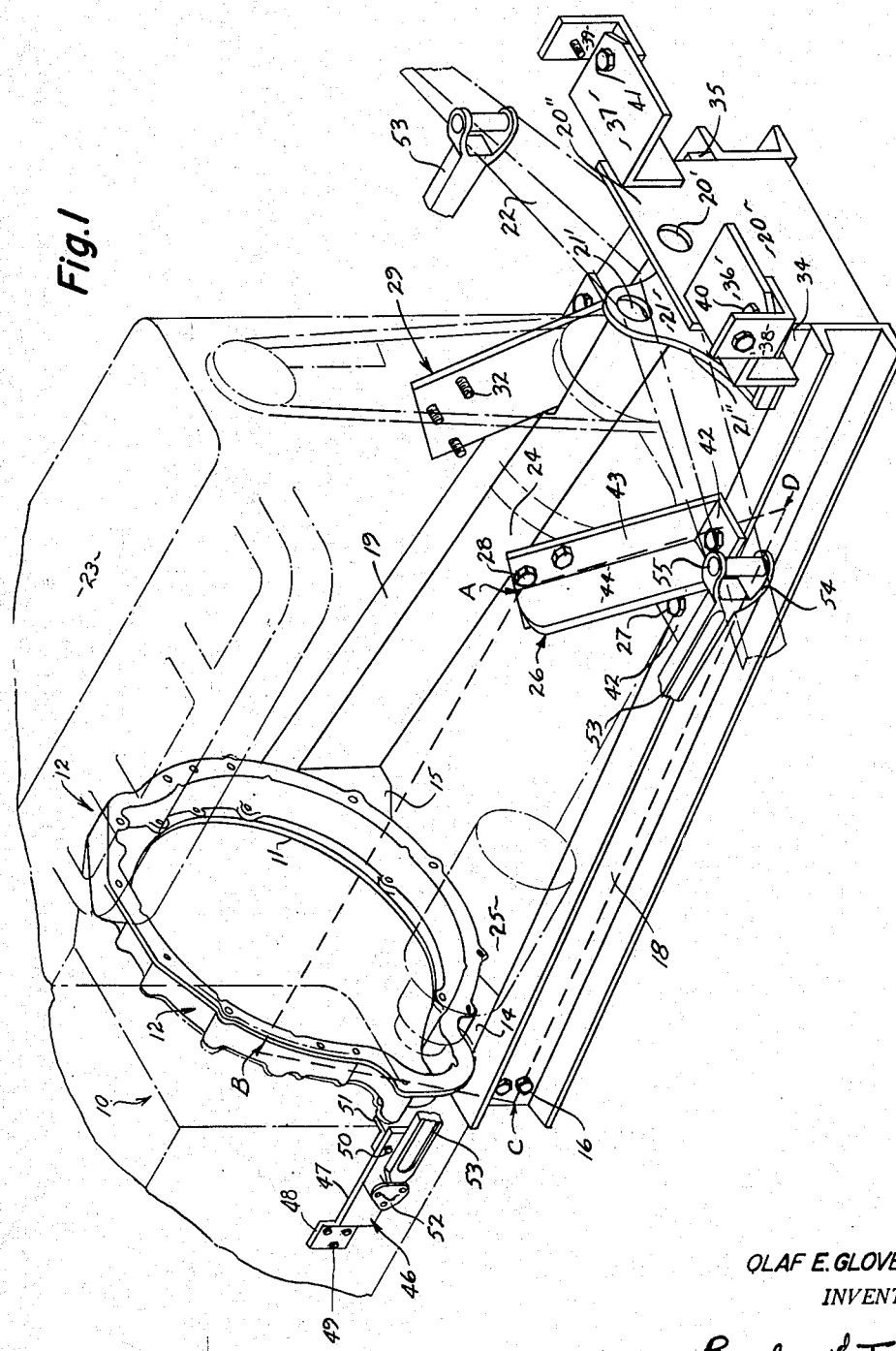

2,593,020

UNITED STATES PATENT OFFICE 2,593,020

FLYWHEEL HOUSING

Olaf E. Glover, Milford, Ill.

Application March 22, 1950, Serial No. 151,130

5 Claims. (Cl. 74—606)

My invention relates to apparatus for use with Ford-Ferguson and Ford farm tractors for mounting therein a six-cylinder engine in place of the customary four cylinder engine with which they are supplied and for providing in the motor mounting a bearing for attaching the front axle of the tractor.

I have found that by increasing the power in a Ford-Ferguson and Ford tractor according to my invention the well-known advantages of this type of tractor's hydraulic system are preserved and this type of tractor and its implements do not have to be replaced to fill the need of more power. I provide a novel means of installing a larger engine, for example, a Ford six-cylinder engine in this type of tractor. When such a tractor is converted according to the apparatus of my invention, the converted tractor will easily handle three 14-inch plows and other implements accordingly. The converted tractor according to my invention also provides for smooth power take-off with increased power.

By insertion of the novel flywheel housing to connect the six-cylinder engine to the transmission and the novel front end frame extending forward from the lower sides of the flywheel housing and mounting the front axle thereto, a highly desirable weight distribution is obtained. The small cost of the novel mounting apparatus according to my invention for increasing the power and working qualities of such a smaller tractor as compared with the cost of a heavy tractor shows a great saving. It has been found through extensive field tests that such tractors converted according to the apparatus of my invention reduces engine overhauls as the engine is never overloaded, even with three 14-inch plows or a 10-foot tandem disc.

It is an object of my invention to provide a framework for mounting a six-cylinder engine in a Ford-Ferguson or Ford type of tractor and to provide in this framework a bearing for supporting the front axle of the tractor.

Another object of my invention is to provide a flywheel housing for connecting the rear end of an engine to the transmission housing of a tractor and to provide on the flywheel housing mounting lugs for attaching side frame support members for the engine and the front axle of the tractor.

A still further object of the invention is to provide a pair of side frame members having a transverse front axle bearing support connecting their front ends, a foot on each side frame member for supporting the forward front sides of the tractor engine and a flywheel housing connecting the rear ends of the side frames to which housing is attached the rear end of the engine and the front end of the transmission housing in the tractor.

Another object of my invention is to provide a flywheel housing having a cylindrical body with an outwardly extending flange front planar face for abutting attachment to the rear end of an engine, an inwardly extending flanged rear planar face for abutting attachment to a tractor transmission housing with an arcuate protuberance in one side of the flywheel housing for attachment of a starter motor and a pair of side frame attaching lugs extending transversely in opposite directions at each bottom side of the flywheeling housing.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitations, since various changes and modifications within the spirit and scope of the invention will become apparent to those skilled in the art from this detailed description.

For a more complete understanding of the nature and scope of my invention reference can be had to the following detailed description taken in connection with the drawings in which:

Figure 1 is a perspective view showing in darker lines the front end mounting in a farm tractor according to my invention of an engine and front axle shown in phantom or broken lines;

Figure 2 is a side elevation of the flywheel housing as viewed from the engine face of housing;

Figure 3 is a view of the flywheel housing as seen from the right hand side of Figure 2 with a broken away portion at the upper portion depicting the cross section of the central upper portion of the housing;

Figure 4 is a cross sectional view of the flywheel housing along lines 4—4 of Figure 2;

Figure 5 is a cross sectional view of the flywheel housing along lines 5—5 of Figure 2; and Figure 6 is a cross sectional view along the lines 6—6 of the flywheel housing shown in Figure 2.

Throughout the various figures in the drawings like reference characters refer to similar parts.

Referring to Figure 1, the forward end of a tractor is in general shown at 10 having attached to the front face of the front flange of its transmission housing at 11 a flywheel cylindrical housing according to my invention generally indicated at 12. Flywheel housing 12 is a casting having oppositely extending mounting lugs 14 and 15 at its bottom side portions to which are attached, as by bolts 16, side frame members 18 and 19 which extend generally longitudinally and converging slightly from their rear ends to their front ends where they are connected by a pair of transverse spaced cross plates 20 and 21. These cross plates 20 and 21 are apertured respectively at 20' and 21' to receive a front axle mounting pin (not shown) which forms a pivotal support for the transversely extending front axle 22 shown in phantom. The tractor engine generally indicated in phantom at 23 is supported rigidly along its front right side 24 by a right foot 26 extending upwardly from the forward end of side frame 18 where it is attached by bolts 27. The upper portion of foot 26 is secured to the motor side 24 by machine screws 28. A left hand side foot 29 is similarly attached to the left hand side frame member 19 by bolts 30 and supports the left hand side of the engine 31 where it is attached to the engine by machine screws 32. The rear face of the engine 23 is attached in abutting relationship to the front face of the flywheel housing 12 as will presently be described in detail.

It is to be noted that a rigid support is formed by this unitary assembly for the engine and the front end mounting for the front axle of the tractor. This rigid assembly for each side of the front end of the tractor may be broadly traced for the right hand side, for example, by following the broken lines A—B—C—D where A represents generally the point of attachment of the right foot 26 to the engine 23, A to B is through the engine to the flywheel housing 12, B—C is through the flywheel housing to the rear end of side frame member 18, C—D is from the flywheel housing forward through the side frame member 18 and D—A is through the foot support 26 connecting the right hand side frame 18 with the right hand forward side 24 of the engine 23.

Still referring to Figure 1 of the drawings each of the side frame members 18 and 19 are of channel beam stock and are assembled with their channel portions facing outward. Other types of beams could be used. The side frames 18 and 19 converge slightly from their rear ends where they are adapted to be interconnected with the tractor transmission housing as by the flywheel housing 12. At their front ends they are connected by the cross plates 20 and 21 as by welding. To give further rigidity to the box-like structure formed by the front ends of side frame members 18 and 19 and the cross plates 20 and 21 a right reinforcing plate 34 and a left reinforcing plate 35 are welded to the ends of the upper portions of the cross plates 20 and 21 above the side frames. The reinforcing plates 34 and 35 may also be tack welded to the adjacent upper surface of the side frames 18 and 19 along which they abut. Thus, there is provided a rigid support for the transverse front axle 22 which is supported by a pivot pin (not shown) passing through the bearings 20' and 21' in the end plates 20 and 21, respectively.

The upper portion 20" of the front or first end plate 20 in Figure 1 is a full extension of the bottom portion thereby making it substantially square in shape while the rear cross plate or second cross plate 21 is cut away along its upper portion along the curved surface 21". The upper portion 20" of plate 20 has welded thereto at its front upper faces a pair of angle iron pieces 36 and 37 which form a support for the radiator (not shown) and have upwardly extending side angle clips 38 and 39 attached as by screws 40 and 41 respectively which secure the hood (not shown).

The right and left foot members 26 and 29 in Figure 1 are fabricated from plate stock welded together to form a rigid unit. The right foot 26 will be described, for example, and is comprised of a bottom plate 42, apertured to receive two bolts 27 attaching it to the upper web of the side frame channel 18. Welded to the inner longitudinally extending edge of plate 42 is a plate 43 which extends upwardly and rearwardly and inclines inwardly toward the adjacent front side engine 23 which it supports. A reinforcing web plate 44 extending transverse to plate 43 may be welded thereto and at its bottom edge to the upper surface of bottom plate 42. This reinforcing web 44 may be omitted in some instances. The upper end of upwardly extending plate 43 is apertured to receive securing screws indicated at 28 which are threadedly received in anchor holes in the engine casing. Placing the upwardly extending plate 43 at an angle tends to afford more rigidity and stability to the support of the front end of the engine.

Attached to each side of the transmission housing of the tractor 10 as shown in Figure 1 are brace strut brackets 46 which are off-set outwardly at 47 from the base portion 48 which is attached to the housing by screws 49. The forward upper end of the off-set portion 47 has attached, as by a bolt 50, an inwardly extending lug 51 which is bolted to the flywheel housing 12 to afford stability to the strut bracket 46. Bolted to the outer forward face of off-set portion 47 on the strut bracket 46 is a socket fixture 52 which receives the rear ball and joint of the strut 53 which extends forwardly to a bifurcated front end 54 where it is attached to the outer end portion of the front axle 22 by a bolt 55.

Referring now to Figures 2 through 6 inclusive, the novel flywheel housing 12 according to my invention will be described.

The flywheel housing 12 has a cylindrical body portion 60, see particularly Figures 3 and 5, with an outwardly extending flange 61 on its forward end which has a front planar face 62 for abutting attachment to the engine and an inwardly extending flange 63 at its rear end having a rear planar face 64 for abutting attachment to a flange on the transmission housing of the tractor. The front and rear planar faces on the flanges are parallel to each other and lie in parallel planes which are perpendicular to the longitudinal axis H—H', see Figure 3, passing through the center of the flywheel housing 12.

In Figure 2 the flywheel housing 12 which is formed by casting has an outwardly extending arcuate protrusion 66 in one side below the central horizontal axis X—X' of the flywheel housing for mounting a starter motor shown at 25 for the engine 23. This protuberance 66 is formed with a continuation of the body portion 60 of the flywheel housing and the outwardly extending front flange 61. An arcuate relief portion 67 is formed in the front flanged face 62 to a depth of about one-quarter of an inch for purposes of receiving the starter motor. The rear face of the protuberance 66 has two threaded apertures 68 and 69 extending therein which are parallel to the longitudinal axis H—H' for receiving machine screws to secure a starter motor cover plate to the rear face of the protuberance.

In Figures 2 and 3 there is shown formed on the bottom sides of the flywheel housing outwardly and oppositely extending lugs 14 and 15 which are below the horizontal axis X—X' of the flywheel housing. The lug 14 is shown in a position below the starter mounting protuberance 66. The lugs 14 and 15 extend in opposite directions transversely to a plane containing the vertical central axis Y—Y' of the flywheel housing 12. Lugs 14 and 15 form a mounting for attaching the rear ends of the side frame members 18 and 19, respectively, see Figure 1. Lug 15, for example, see Figures 2 and 3, comprises an outwardly extending web 70 having an upper web 71 and a lower web 72 extending transverse to web 70 all of which are cast integral and connect with a vertically extending flange portion 73 which is apertured at 74 and 75 to receive side frame mounting bolts 16, see Figure 1. The outer portion 73 of the flange is shown formed with a face 73' which inclines slightly inward towards the vertical central plane of the flywheel from rear to front to accommodate abutting attachment of the side channel frames 18 and 19 which converge slightly from rear to front, see Figure 1.

The inner peripherial area portion of the inwardly extending rear flange 63 on the flywheel housing 12 has extending therethrough a plurality of threaded apertures designated T which are circumferentially spaced about the flywheel housing and parallel to each other and the longitudinal axis H—H' of the flywheel housing for receiving machine screws which attach the flanged forward end of the transmission housing 11, see Figure 1, to the rear flange of the flywheel housing. A threaded aperture T' extending also in the rear inwardly extending flange receives a machine screw for connecting the transmission housing to the flywheel housing. In addition, two threaded apertures T'' are provided in the rear face 64 at each side of the flywheel housing above the horizontal center line for receiving transmission securing screws.

In my flywheel housing there is also provided a plurality of circumferentially spaced and parallel through apertures designated E which extend from the outer peripherial portion of the planar face 64 of the rear flange through the central body portion 60 to the front face 62 of the front flange of the housing for receiving machine screws whose heads abut the rear face 64 and whose threaded ends are screwed into the rear end of the engine 23. In addition, two through holes E' at the top and at the bottom of the flywheel housing 12 serve to receive machine screws for attaching the housing to the rear of the engine. These holes E' are shown in cross section in Figure 4 and the rear end of the hole E' terminates in a relieved portion indicated at 64' in the rear face of the flywheel housing. Thus, the heads of the machine screws (not shown) inserted in holes E' will rest against the face of the relieved portion 64'.

Further reference to Figure 2 shows a pair of apertures 77 formed about one-half inch deep in the front face 62 of the flywheel housing at each side above the horizontal center axis X—X' for receiving aligning pins (not shown) which project from the rear of the engine 23. Likewise, there is formed a pair of apertures 78 in the rear face of the housing and at each side above the horizontal axis X—X' for receiving aligning pins (not shown) which project from the flanged forward end of the tractor transmission.

The conversion unit according to my invention provides for easy and low cost conversion from a four-cylinder tractor engine to a six-cylinder more powerful tractor engine for the same size of tractor. This conversion apparatus according to my invention has been highly received by the trade and those desiring increased power in a relatively small size of tractor.

I claim as my invention:

1. An engine flywheel housing for connecting the rear end of an engine to the forward end of a transmission housing in a farm tractor comprising a substantially cylindrical body portion, an outwardly extending flange on the forward end of the cylindrical body having a planar face for abutting attachment with the rear of the engine, and an inwardly extending flange on the rear end of the cylindrical body having a planar face with the inner peripherial portion of which adapted for abutting attachment to the front of the transmission housing, said planar faces on the flanged ends being parallel to each other and perpendicular to the longitudinal axis of the cylindrical body portion, said cylindrical body portion having a plurality of circumferentially spaced apertures extending from an outer peripherial area portion of the rear face to the front face thereof and parallel to the longitudinal axis of the cylindrical body portion for receiving machine screws to secure the flywheel housing to the rear end of the engine, and said rear flanged planar face in the area of said inner peripherial area portion thereof having a plurality of circumferentially spaced threaded apertures extending therein parallel to the longitudinal axis of the cylindrical body for receiving machine screws for attaching the forward end of the transmission housing to said flywheel housing.

2. A flywheel housing of the character described in claim 1 further characterized in having an outwardly extending arcuate protuberance in one side below the central horizontal axis of the flywheel housing and extending from the front face to the rear face of the flywheel housing for attachment of a starter motor.

3. A flywheel housing of the character described in claim 1 further characterized in having a pair of side mounting lugs at each side of the bottom of the flywheel housing and extending in opposite directions outwardly and transverse to the vertical plane containing the longitudinal axis of the flywheel housing.

4. An engine flywheel housing for connecting the rear end of an engine to the forward end of a transmission housing in a farm tractor comprising in combination a substantially cylindrical body portion, an outwardly extending flange on the forward end of the body having a planar face for abutting attachment to the rear of the engine, an inwardly extending flange on the rear end of the body having a planar face for abutting attachment to the forward end of the transmission housing, said body portion having a plurality of circumferentially spaced apertures adjacent its outer cylindrical periphery extending from the rear face to the front face of the housing and parallel to the longitudinal axis of the cylindrical body portion for receiving machine screws to secure the flywheel housing to the rear end of the engine, said rear flanged face having a plurality of circumferentially spaced threaded apertures therein extending parallel to the longitudinal axis of the cylindrical body for receiving machine screws thereby attaching the forward end of the transmission housing to said flywheel housing, said flywheel housing having an outwardly extending arcuate protuberance in one side below its central horizontal axis and extending from the front face to the rear face and provided with an outwardly extending flange joining with said front flange on the cylindrical body portion for attachment of a starter motor, and a pair of side mounting lugs at each side of the bottom of the flywheel housing with one being positioned below said arcuate protuberance and each extending in opposite directions outwardly and transversely to a vertical plane containing the longitudinal axis of the flywheel housing.

5. An engine flywheel housing for connecting the rear end of an engine to the forward end of a transmission housing in a farm tractor comprising in combination a substantially cylindrical body portion, an outwardly extending flange on the forward end of the body portion having a planar face for abutting attachment to the rear of the engine, an inwardly extending flange on the rear end of the body portion having a planar face for abutting attachment to the forward end of the transmission housing, said body portion having a plurality of circumferentially spaced apertures adjacent its outer cylindrical periphery extending from the rear face to the front face of the housing and parallel to the longitudinal axis of the flywheel housing for receiving machine screws to secure the flywheel housing to the rear end of the engine, said body portion having a pair of spaced apertures at its top portion and a pair of spaced apertures at its bottom portion extending from relieved portions in the rear face to the front face pin receiving aperture at each side of the flywheel housing in the front and rear faces above the horizontal central axis of the flywheel housing, said flywheel housing having an outwardly extending arcuate protuberance in one side below its central horizontal axis and extending from the front face to the rear face and provided with an outwardly extending flange forming with said front flange on the cylindrical body portion for attachment of a starter motor, and parallel to the longitudinal axis of the flywheel housing for receiving machine screws to secure the flywheel housing to the rear end of the engine, said rear face having a plurality of circumferentially spaced threaded apertures therein extending in the inner peripherial portion of said body portion and parallel to the longitudinal axis of the flywheel housing for receiving machine screws thereby attaching the forward end of the transmission housing to said flywheel housing, an aligning pin receiving aperture at each side of the flywheel housing in the front and rear faces above the horizontal central axis of the flywheel housing, said flywheel housing having an outwardly extending arcuate protuberance in one side below its central horizontal axis and extending from the front face to the rear face and provided with an outwardly extending flange forming with said front flange on the cylindrical body portion for attachment of a starter motor, and a pair of side mounting lugs at each side of the bottom of the flywheel housing with one being positioned below said arcuate protuberance and each extending in opposite directions outwardly and generally transversely to a vertical plane containing the longitudinal axis of the flywheel housing, said mounting lugs having outer planar faces for attaching side mounting frames.

OLAF E. GLOVER.

REFERENCES CITED

The following references are of record in the file of this patent:

UNITED STATES PATENTS

| Number | Name | Date |
| --- | --- | --- |
| 1,738,805 | Taylor | Dec. 10, 1929 |
| 1,824,440 | Meyer | Sept. 22, 1931 |
| 1,885,566 | Tevis et al. | Nov. 1, 1932 |
| 2,221,546 | Johnston et al. | Nov. 12, 1940 |
| 2,254,360 | Frudden et al. | Sept. 2, 1941 |
| 2,441,990 | Calhoun | May 25, 1948 |